United States Patent [19]

Volk, Jr.

[11] 3,707,978
[45] Jan. 2, 1973

[54] AUTOMATIC CONTROL AND ANTIBACKLASH SYSTEM

[75] Inventor: Joseph A. Volk, Jr., Florissant, Mo. 63033

[73] Assignee: Beta Corporation of St. Louis, Mo.

[22] Filed: Sept. 24, 1971

[21] Appl. No.: 183,429

[52] U.S. Cl.....................................137/2, 137/487.5
[51] Int. Cl................................................F16k 31/12
[58] Field of Search...............................137/2, 487.5

[56] References Cited

UNITED STATES PATENTS

| | | | |
|---|---|---|---|
| 3,357,428 | 12/1967 | Carlson | 137/487.5 X |
| 3,369,561 | 2/1968 | Zimmerman et al. | 137/487.5 X |
| 3,454,037 | 7/1969 | Grace et al. | 137/487.5 |

Primary Examiner—Henry T. Klinksiek
Attorney—Rogers, Ezell, Eilers & Robbins

[57] ABSTRACT

This invention relates to a system for controlling the rate of fluid flow within close tolerances while providing correction for backlash and includes mechanical means for controlling the rate of fluid flow, means for indicating the rate of fluid flow relative to prescribed limits, means for increasing the rate of fluid flow when the rate drops below the lower limit, and means for decreasing the rate of fluid flow when the rate goes above the upper limit. An antibacklash network is provided for removing slack or backlash in the mechanical control means whenever it, in making a correction, is made to operate in a reverse direction. The system further includes means for signalling malfunctions in the fluid system and for measuring the quantity of fluid flowing through the system.

19 Claims, 1 Drawing Figure

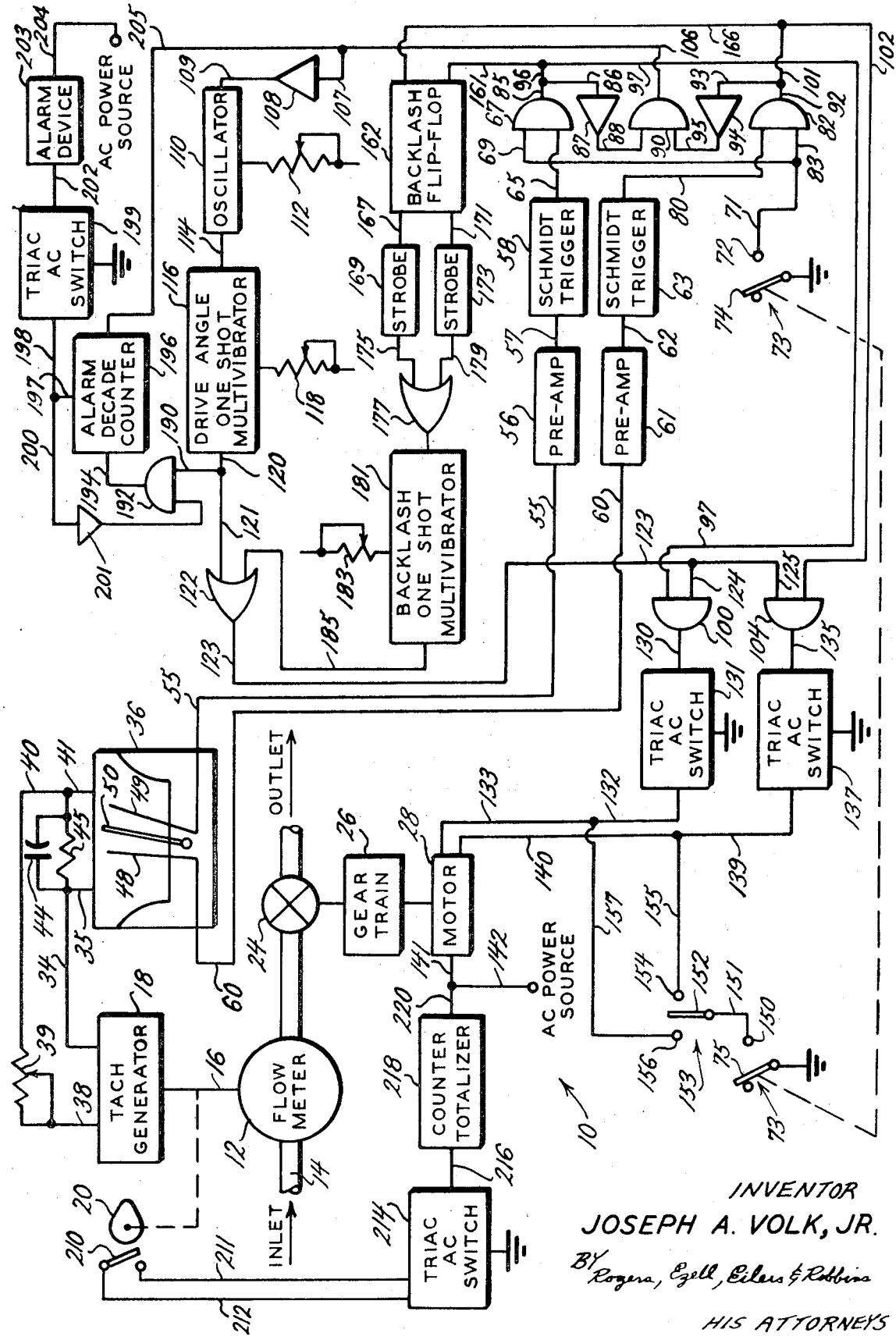
INVENTOR
JOSEPH A. VOLK, JR.
BY Rogers, Ezell, Eilers & Robbins
HIS ATTORNEYS

AUTOMATIC CONTROL AND ANTIBACKLASH SYSTEM

SUMMARY OF THE INVENTION

One of the problems with automatic control systems (for example those used in controlling the rate of flow of a particular liquid) has been the difficulty of providing control within close tolerances due to backlash or slack in the mechanical portions of the system. Backlash is inherent in any system where mechanical equipment such as motors, gear trains, and valves are used for providing the control. If the correction is made quickly enough to remove the backlash, the system usually overcorrects for normal control. On the other hand, if the corrections are made in very small intervals, it takes forever to remove the backlash and by that time the flow rate may have changed appreciably. With this invention the backlash can be quickly removed while controlling the flow rate within very close tolerances.

The system generally includes a flow meter which measures the rate of flow of fluid through a fluid line. A valve in the fluid line controls the flow rate, which valve is driven by a gear train and motor. A meter is provided for indicating the flow rate in accordance with information from the flow meter, and for setting the limits within which the rate is to be controlled.

A logic network initiates the generation of pulses of fixed widths from a drive angle multivibrator whenever the flow rate drops below the lower limit or above the upper limit, and gates these pulses to an appropriate triac switch to close the switch for the duration of each pulse. When one of the triac switches is closed, AC power is applied across an appropriate motor winding within the motor causing it to turn in a direction to either open or close the valve in the fluid line. The direction the motor is made to rotate, of course, depends on whether the correction requires opening or closing the valve. This selection is made in accordance with the logic network.

Whenever the flow rate changes such that the meter indicator moves across both the lower and upper limits, in either direction, the mechanical components must be made to reverse direction to make the correction. In other words, the motor, gear train, and valve will be made to rotate in a direction opposite to that in which it just previously rotated when making its last correction. When this condition occurs, there is a considerable amount of backlash in the mechanical components that must be removed before any noticeable correction is made in the rate of fluid flow. This condition is detected by the logic network which generates signals causing a flip-flop to change state, thereby producing a strobe which initiates the generation of a backlash pulse from a backlash multivibrator. The width of this backlash pulse is adjusted in accordance with the amount of backlash in the system, but is usually of considerably longer duration than the pulses from the drive angle multivibrator used to make the flow rate corrections. This pulse is fed through the logic network and used to energize the motor for a sufficient time to remove the backlash. After the backlash is removed, which occurs very quickly, the narrower width pulses from the drive angle multivibrator make the fine corrections in the flow rate, thereby maintaining very close tolerances while at the same time removing the backlash from the system.

This system also includes means for measuring the quantity of fluid that flows past the flow meter and means for signalling a malfunction in the fluid system. This latter means includes a decade counter which counts the number of pulses from the drive angle multivibrator. After a prescribed number of pulses are counted, enough to indicate that automatic control is impossible and hence there is trouble in the system, the counter produces a signal which energizes an alarm device.

DESCRIPTION OF THE DRAWING

The drawing is a schematic diagram of the automatic control and antibacklash system of this invention.

DETAILED DESCRIPTION OF THE PREFERRED EMBODIMENT

In the drawing there is shown a fluid flow control system 10 including a flow meter 12 connected in a fluid feed line 14 for measuring the flow rate of the liquid through the line. The flow meter 12 includes an output shaft 16 which drives a tach generator 18, and also a cam 20, the purpose for which will be hereinafter explained.

Also in the feed line 14 is a valve 24 which is preferably a ball type valve, although other types such as shutter and gate valves could be used. The valve 24 is operated through a gear train 26 by a motor 28. Hence operation of the motor in one direction opens the valve, while operation of the motor in the other direction closes the valve. It is the opening and closing of the valve 24 by operation of the motor 28 that is controlled by this system to in turn control the rate of liquid flow through the feed line 14.

The tach generator 18 has an output conductor 34 connected through a conductor 35 to one input of a dual set point ammeter 36, and an output conductor 38 connected through a potentiometer 39, a conductor 40 and a conductor 41 to another input of the ammeter 36. A capacitor 44 and resistor 45 are connected in parallel between the inputs of the meter 36.

The meter 36 has a lower limit set pointer 48, an upper limit set pointer 49 and an indicating needle 50. It is of a standard type, commonly known in the art, which indicates by appropriate signals at its outputs whether the indicating needle 50 is below, between, or above the pointers 48 and 49. The potentiometer 39 and the resistor 45 are for the purposes of calibrating the meter 36. The capacitor 44 acts primarily as a filter.

When the indicating needle 50 of the meter 36 moves upscale to a position adjacent the upper limit pointer 49, a signal is fed through an output conductor 55, a pre-amp network 56, where the signal is amplified, and a conductor 57 to the input of a Schmidt trigger 58. When the indicating pointer 50 of the meter 36 moves downscale to a position adjacent the lower limit pointer 48, a signal is fed through a conductor 60, a pre-amp network 61 of the same type as the pre-amp network 56, and a conductor 62 to the input of another Schmidt trigger 63. Although the signal on either the output conductor 55 or 60 from the meter 36 appears very quickly, it nevertheless has a finite slope. The Schmidt triggers 58 and 63 sense when the output signals from the pre-amps 56 and 61, respectively, reach a certain level and immediately produce at their output a one level signal. The outputs of the Schmidt triggers 58 and 63 go from a zero level to a one level in a matter of only a few nanoseconds, so as to effectively sharpen the signal at the outputs of the pre-amps 56 and 61 for use in the network logic.

The output of the Schmidt trigger 58 is connected through a conductor 65 to one input of an AND gate 67. The AND gate 67 has another input connected by a conductor 69 and a conductor 71 to the normally open terminal 72 of a double-pole, double-throw switch 73 having wiper arms 74 and 75 connected to ground. The output from the Schmidt trigger 63 is connected through a conductor 80 to one input of an AND gate 82 having another input connected by a conductor 83 and the conductor 71 to the normally open terminal 72 of the switch 73. The output from the AND gate 67 is connected through a conductor 85, a conductor 86, an inverter 87, and a conductor 88 to one input of an AND gate 90. The output from the AND gate 82 is connected through a conductor 92, a conductor 93, an inverter 94, and a conductor 95 to the other input of the AND gate 90.

The output from the AND gate 67 is also connected through the conductor 85, a conductor 96, and a conductor 97 to one input of an AND gate 100. The output of the AND gate 82 is also fed through the conductor 92, a conductor 101, and a conductor 102 to one input of an AND gate 104.

The output from the AND gate 90 is connected through a conductor 106, a conductor 107, an inverter 108, and a conductor 109 to the input of an oscillator 110. As long as the input of the oscillator 110 is at a one level, the oscillator generates a series of sharp pulses, the frequency of which is adjustable with a potentiometer control 112. The exact frequency used depends on such factors as the viscosity of the fluid and the pressure drop across the fluid inlet and outlet. A frequency range of between two pulses per second and one pulse every two seconds is an example of a normal range. When the signal at its input is at a zero level, the oscillator 110 is inhibited. As will be seen, this occurs whenever the indicating needle 50 is within the accepted range between the pointers 48 and 49. Whenever the needle 50 moves below the pointer 48 or above the pointer 49, the oscillator 110 is enabled.

The output pulses from the oscillator 110 are fed through a conductor 114 to a drive angle, one shot multi-vibrator 116 which produces a pulse, the width of which is adjustable by a potentiometer control 118, for each pulse received at its input from the oscillator 110. The pulses from the multivibrator 116 are fed through a conductor 120, a conductor 121, an OR gate 122, a conductor 123, and a conductor 124 to the other input of the AND gate 100; and through a conductor 125 to the other input of the AND gate 104.

As will be explained, whenever the flow rate becomes excessive, that is, whenever the indicator 50 moves past the pointer 49, the AND gate 100 is enabled, and whenever the flow rate becomes too low, that is, whenever the indicator 50 moves below the pointer 48, the AND gate 104 is enabled. When the AND gate 100 is enabled, a signal is fed from its output through a conductor 130 to the gate of a triac AC switch 131. The triac switch 131 has an output connected by a conductor 132 and a conductor 133 to a winding of the motor 28 which, when energized with AC power, causes the motor 28 to turn in a direction to close the valve 24. In a similar manner, when the AND gate 104 is enabled, a signal is fed from its output through a conductor 135 to the gate input of a triac AC switch 137. The switch 137 has an output connected by a conductor 139 and a conductor 140 to another winding of the motor 28 which, when energized with AC power, causes the motor to turn in a direction to open the valve 24. Both windings of the motor 28 are connected through a conductor 141 and a conductor 142 to a source of AC power. The triac switches 131 and 137 are such that a signal at their gate inputs connect their outputs to ground. Hence, when the switch 131 is enabled, AC power from the power source energizes one motor winding, and when the switch 137 is enabled, AC power from the power source enables the other motor winding.

Another normally open terminal 150 of the manual switch 73 is connected by a conductor 151 to the wiper arm 152 of a manual switch 153. One normally open contact 154 of the switch 153 is connected by a conductor 155 to the conductor 140 leading to one winding of the motor 28. Another normally open contact 156 of the switch 153 is connected by a conductor 157 to the conductor 133 leading to the other winding of the motor 28. As will be explained, by placing the switch 73 in its normally open position, the automatic circuit is disabled, and by manually operating the switch 153 to engage the contact 154 or 156, one side of a winding of the motor 28 is grounded to cause the valve 24 to open or close as desired. This would be useful, for example, if there is a breakdown in the automatic network.

An important feature of this invention is the anti-backlash network. The combination of the motor 28, gear train 26, and valve 24 has inherently associated with it a certain amount of backlash, or slack. As long as the motor is running in one direction, this backlash is no problem, nor is it a problem where the motor was first running in one direction, then stopped, and then again run in that same direction. The problem only arises where the motor is first made to run in one direction, and then in the opposite direction. The only time this is required is when the indicating needle 50 moves completely across both set pointers 48 and 49, for this is the only time that the valve 24 must be made to either close from a just-prior opening operation, or open from a just-prior closing operation. For example, if the needle 50 is below the pointer 48, the network of this system will open the valve to increase the fluid flow, and to move the needle 50 upscale. If the needle 50 again moves below the pointer 48, the system will open the valve 24 still more, and there will be no slack to take up. But if the increase in fluid flow eventually causes the needle 50 to move above the pointer 49, the system will close the valve requiring the motor and gear train to reverse directions as well so that there will be a certain amount of slack or backlash that must be taken up before flow rate control can begin. The same, of course, is true if the needle 50 begins above the pointer 49. Here the system will close the valve 24 causing fluid flow to decrease and the needle 50 to move below the pointer 49. If the fluid flow later increases the needle 50 will again move above the pointer 49, the system will tend to close the valve 24 all the more, and there will be no slack to take up. But if instead the needle 50 moves further downscale to a position below the pointer 48, the system will open the valve 24 reversing the directions of the gear train and motor as well so that there will be slack and backlash to take up before flow rate control can begin.

Without the antibacklash feature of this invention it would be very difficult, if not virtually impossible, to achieve a fine flow rate control (within approximately one-half percent), because with such fine control it would take too long to remove the backlash whenever the needle 50 moves across both pointers. By the time the system made the correction, the flow rate might be greatly changed. However, the antibacklash network of this invention provides such control.

The output of the AND gate 67 is also connected through the conductors 85 and 96, and a conductor 161 to one input of a backlash flip-flop 162. The output of the AND gate 82 is fed through the conductors 92 and 101, and a conductor 166 to the other input of the flip-flop 162. The only time the outputs of the flip-flop 162 change state is when the signals at its inputs change state, and this is only when the needle 50 moves completely across the pointers 48 and 49. The flip-flop 162 has an output connected by a conductor 167 to the input of strobe 169, and an output connected by a conductor 171 to the input of a strobe 173. When the input to the strobe 169 or 173 goes from a one level to a zero level the strobe produces at its output a strobe pulse, which, in the case of the strobe 169 is fed through a conductor 175 to one input of an OR gate 177, and in the case of the strobe 173 is fed through a conductor 179 to another input of the OR gate 177. Hence, one of the strobes 169 or 173 generates a strobe pulse whenever the needle 50 moves from below the pointer 48 to above the pointer 49, and the other generates a strobe pulse whenever the needle 50 moves from above the pointer 49 to below the pointer 48. These strobe pulses are fed through the OR gate 177 to the input of a backlash one shot multivibrator 181 which produces at its output, for each such strobe pulse, a pulse having a width adjustable by a control potentiometer 183. The pulse from the output of the multivibrator 181 is fed through a conductor 185, the OR gate 122, and the conductor 123 to the AND gates 100 and 104, just as the pulses from the output of the multivibrator 116. The width of the pulse at the output of the multivibrator 181 is adjusted to suit the amount of backlash in the system and will normally be several times (perhaps 10 or 15 times) greater than the widths of the pulses from the multivibrator 116 used to make the flow rate corrections.

The network of this invention also includes an alarm system for signalling a possible malfunction in the flow system. This might occur, for example, when the valve 24 is malfunctioning or a filter screen in the flow pipe has become clogged. When such things occur, the system, of course, is unable to make the required correction. The alarm network signals such a condition.

The output pulses from the multivibrator 116 are fed through the conductor 120 and a conductor 190 to one input of an AND gate 192, the output of which is connected through a conductor 194 to an alarm decade counter 196. The counter 196 counts the pulses from the multivibrator 116 until it reaches some predetermined count, which may be set as desired. For example, if it is determined that any correction should be made with no more than eight pulses from the multivibrator 116, then the counter 196 would be set to count up to eight. When the count reaches eight, a signal appears at the output of the counter 196 which is fed through a conductor 197 and a conductor 198 to the gate of a triac AC switch 199, as well as through a conductor 200 and an inverter 201 to the other input of the AND gate 192. The switch 199 has an output connected by a conductor 202 to the input of an alarm device 203, the output of which is connected by a conductor 204 to a source of AC power. When the counter 196 reaches the set count, the signal at its output closes the switch 199, grounding the input side of the alarm device 202, thereby turning it on. The alarm device 203 may be a siren, a bell, a buzzer, a light signal, or some other suitable electrical signalling device. The signal from the inverter 201 inhibits the AND gate 192 to hold the counter 196 at an eight count and the alarm 203 on.

The output of the AND gate 90 is connected through the conductor 106 and a conductor 205 to a clear input of the counter 196. When the output of the AND gate 90 is at a one level, which, as will be seen, occurs when the indicating needle 50 is between the pointers 48 and 49, the alarm decade counter 196 is cleared, the switch 199 opened, and the alarm device 203 is deenergized.

The system also includes a network for measuring the quantity of fluid that flows past the meter 12. The cam 20 is geared to make one revolution each time a predetermined amount of fluid, for example one pound, flows past the meter 12. As the cam 20 makes a revolution it closes a limit switch 210 which connects +5 v. on a conductor 211 through the switch 210 and a conductor 212 to the gate of a triac AC switch 214. The output of the switch 214 is connected by a conductor 216 to the input of the counter totalizer 218. The other side of the counter 218 is connected by a conductor 220 and the conductor 142 to the source of AC power. Each time the triac switch 214 is closed by the closing of the limit switch 210 as operated by the cam 20, AC power is placed across the counter totalizer 218 causing it to register another count. At any given time the totalizer 218 visually indicates the total number of pounds that have flowed past the meter 12 in a given period.

OPERATION

To operate the system in the automatic mode the manual switch 73 is placed in the normally closed position as shown in the drawing, the limit pointers 48 and 49 are set to control the rate of fluid flow within the desired limits, the widths of output pulses from the multivibrator 116 are adjusted to provide the normal flow correction desired, and the width of the output pulse from the backlash multivibrator 181 is set to provide an initial backlash correction commensurate with the amount of slack or backlash in the system. The ammeter 36 is calibrated by adjusting the potentiometer 39.

As fluid flows through the conduit 14 and passes the meter 12, the rate of this flow is indicated by the indicating needle 50 of the meter 36. As long as the needle 50 is between the pointers 48 and 49 there are no signals to the inputs of the preamps 56 and 61 or at the outputs of the Schmidt triggers 58 and 63, and hence the AND gates 67 and 82 are disabled. With these gates disabled, their outputs are at a zero level causing there to be no change in state of the backlash flip-flop 162 and no correction for backlash. The gates 100 and 104 are also disabled so that the AC switches 131 and 137 remain open and the motor 28 inoperable. Also, with the outputs of the AND gates 67 and 82 at zero levels, the inputs of the AND gate 90 are at one levels, these signals having gone through the invertors 87 and 94, producing a one level signal at the output of the AND gate 90 which is fed through the conductor 106 and the conductor 107 to the input of the invertor 108. The output of the invertor 108 is therefore at a zero level which inhibits the oscillator 110. With the oscillator 110 inhibited there are no pulses generated at the output of the multivibrator 116 to make corrections. Hence, as long as the indicating needle 50 is between the pointers 48 and 49 all is going well and the correction control network remains inoperative.

If the needle 50 moves above the pointer 49 a signal is fed through the conductor 55 to the preamp 56 where it is amplified, and then to the Schmidt trigger 58. The output of the Schmidt tripper 58 is a one level signal which enables the AND gate 67 producing a one level signal at its output which is inverted by the inverter 87 to a zero level at its output which is inverted to a one level signal by the invertor 108 to enable the oscillator 110. For each pulse from the oscillator 110 the multivibrator 116 produces a pulse of the selected width which is fed through the OR gate 122 to an input of each of the AND gates 100 and 104. The one level output from the AND gate 67 is also fed through the conductor 97 to the other input of the AND gate 100, enabling the AND gate 100 and producing a one level signal at its output for the duration of each pulse from the multivibrator 116. These one level signals close the triac switch 131 causing the motor 28 to operate in a direction tending to close the valve 24. Hence for each pulse from the multivibrator 116, the motor 28 turns a prescribed length of time to close the valve 24 a predetermined amount.

As the valve 24 closes, the rate of fluid flow is reduced as indicated by the flow meter 12 and indicating needle 50. The needle 50 will therefore begin to move downscale. As soon as it moves to a position just below the pointer 49, the signal on the output conductor 55 from the meter 36 goes to zero, and the output of the AND gate 67 goes to a zero level. This disables the AND gate 100 so that the triac switch 131 remains open and the motor 128 deenergizes. Also, the output of the AND gate 90 goes to a one level inhibiting the oscillator 110 so that no correction pulses are produced at the output of the multivibrator 116.

As long as the fluid flow rate stays within the prescribed limits, the automatic control network will make no further corrections. However, suppose that the rate of flow decreases to where the needle 50 moves below the pointer 48. When this occurs, a signal is produced at the output conductor 60 from the meter 36 which is fed through the preamp 61, where it is amplified. The amplified signal is fed to the Schmidt trigger 63 producing a one level signal which is fed to the AND gate 82. With the AND gate 82 enabled, the one level signal is fed through the conductors 92, 101 and 166 to one input of the backlash flip-flop 162.

At this point it will be remembered that the needle 50 has traveled from above the pointer 49 to below the pointer 48. This meets the condition of the needle moving completely across both pointers, which as previously explained, is the one condition where the motor 28, gear train 26, and valve 24 change direction and there is backlash in the system. When the needle 50 was above the pointer 49, the input conductor 161 to the flip-flop 162 was at a one level and the input conductor 166 was at a zero level. Now that the indicating needle 50 is below the pointer 48, the signal on the input conductor 161 is at a zero level and the signal on the conductor 166 is at a one level. Since the input signals to the flip-flop 162 are now reversed, its output signals also reverse, causing a strobe pulse to be generated at the output of one of the strobes 169 and 173. This strobe pulse is fed through the OR gate 177 to the backlash multivibrator 181, producing a pulse of the selected width. This pulse, which is of considerably longer duration than a pulse from the output of the multivibrator 116, is fed through the OR gate 122 to one input of each of the AND gates 100 and 104.

The one level output from the AND gate 82 is also fed through the conductor 102 to the other input of the AND gate 104 enabling the gate and producing a one level signal at its output that closes the triac switch 137 for the duration of the backlash pulse. During this time, the motor operates in the direction opposite to that in which it just previously operated to remove the backlash from the gear train 26.

In the meantime, the one level output from the AND gate 82 is inverted by the invertor 94, the zero level output of which disables the AND gate 90. With the AND gate 90 disabled, its output drops to a zero level producing a one level signal at the output of the invertor 108 to enable the oscillator 110. The oscillator 110 and the multivibrator 116 then operate in the same manner as with the indicating needle 50 above the pointer 49 to produce correction pulses of fixed width which are fed to the AND gates 100 and 104. With the AND gate 104 enabled, each of these pulses closes the triac switch 137 to cause the motor 28 to rotate in a direction tending to open the valve 24. These correction pulses continue until the rate of fluid flow increases to where the needle 50 is above the pointer 48, at which time the signal on the output conductor 60 from the meter 36 will drop to zero and the pulses from the multivibrator 116 will cease.

It will be noted that while the multivibrator 116 is made to generate pulses until correction is made to within the prescribed limits, the multivibrator 181 produces only a single pulse of sufficient width to remove the backlash. The anti-backlash network will not again be activated unless the needle 50 moves above the pointer 49. If this should occur, it would have again moved across both pointers 48 and 49, the output of the backlash flip-flop 162 would again change state, a strobe would be generated, and a backlash pulse would be fed through the AND gate 100 to cause the motor to drive in the opposite direction to remove slack in the gear train 26.

Whether the needle 50 is below the pointer 48 or above the pointer 49, the output pulses from the multivibrator 116 are fed through the AND gate 192 to the alarm decade counter 196. When the count reaches a prescribed number, the triac switch 199 is closed and the alarm device 203 activated, indicating trouble in the system and the system's inability to make the correction. If the needle 50 should drop back between the limits 48 and 49, the output of the AND gate 90 goes to a one level to clear the decade counter 196 and deenergize the alarm 203.

The counter 196 can also be cleared by placing the manual switch 73 in the normally open position. This forces one of the inputs of each of the AND gates 67 and 82 to ground, thereby disabling these gates and producing a one level signal at the output of the AND gate 90.

Placing the switch 73 in the normally open position also places the system in the manual mode, for, regardless of the position of the needle 50, the AND gates 67 and 82 remain disabled. This effectively disables the automatic control network. Then by moving the switch 153 in contact with the terminal 154, the motor 28 is made to rotate in a direction tending to open the valve 24, and by moving the switch 153 in contact with the terminal 156, the motor 28 is made to rotate in a direction tending to close the valve 24. Hence, by manually operating the switch 153, the rate of flow can be controlled within the prescribed limits.

As previously explained, the cam 20, switch 210, triac switch 214 and counter totalizer 218 are continuously operating to measure the quantity of fluid moving past the meter 12.

Therefore, a system has been described for providing control within extremely close tolerances while providing correction for slack or backlash in the system.

Various changes and modifications may be made within this invention, as will be readily apparent to those skilled in the art. Such changes and modifications are within the scope and teaching of this invention as defined by the claims appended hereto.

What is claimed is:

1. A method for controlling a particular variable of an operation having mechanical backlash, comprising the step of detecting changes in the variable being controlled, indicating a measure of these changes in relation to upper and lower limits within which the variable is to be controlled, generating electrical correction signals whenever the variable varies outside these limits, correcting the variable to within the limits in response to the electrical correction signals, generating an electrical backlash signal whenever the variable varies across both limits, and correcting the operation for mechanical backlash in response to the backlash signal.

2. An automatic control system for controlling the rate of fluid flow through a fluid line of a fluid system characterized as having backlash, the control system comprising means for measuring the flow rate of the fluid in relation to limits within which the flow rate is to be controlled, a valve means in the fluid line for controlling the flow rate of the fluid, a motor connected to the valve means such that operation of the motor in one direction tends to open the valve means, and operation of the motor in the opposite direction tends to close the valve means, means for generating electrical correction signals whenever the measuring means indicates a flow rate outside the limits, means for operating the motor means in response to the signals in a direction to cause the flow rate to change to within the prescribed limits, means for generating an electrical backlash signal whenever the flow rate varies across both limits, and means for operating the motor means in response to the backlash signal in a direction to remove the backlash from the system.

3. The automatic control system of claim 2 including means for inhibiting the signal generating means whenever the flow rate is within the limits.

4. The system of claim 2 wherein the measuring means includes an ammeter having upper and lower limit sets, the ammeter including means to generate a signal at one output whenever the meter indicates a measurement below the lower set, and means for generating a signal at another output whenever the meter indicates a measurement above the upper set.

5. The system of claim 4 wherein the measuring means further includes a tach generator, a flow meter for detecting the rate of fluid flow, means associated with the flow meter for driving the tach generator at a rate proportional to the flow rate, the tach generator including means for generating electrical signals proportional to the rate at which it is driven, and means for feeding the electrical signals from the tach generator to the ammeter for indicating the flow rate of the fluid.

6. The system of claim 2 wherein the motor means includes a motor having a first winding which when energized causes the motor to operate in a clockwise direction, and a second winding which when energized causes the motor to operate in a counterclockwise direction, and including a gear train mechanically connected between the motor means and the valve means.

7. The system of claim 2 including means for measuring the quantity of fluid through the fluid system.

8. The system of claim 2 including means for signalling a malfunction in the fluid system.

9. The system of claim 8 wherein the signalling means includes means for counting the number of correction signals, means for generating a signal when the count reaches a prescribed number, electrical signalling means, and means responsive to the last named signal for activating the electrical signalling means.

10. The system of claim 2 including an oscillator means for generating a continuous series of pulses when enabled, means for enabling the oscillator means whenever the flow rate varies to outside the limits, and means for generating the correction signals in response to the output pulses from the oscillator means.

11. The system of claim 10, including means for adjusting the frequency of the output pulses from the oscillator means.

12. The system of claim 10 including means for inhibiting the oscillator means whenever the flow rate is within the prescribed limits.

13. The system of claim 10 wherein the correction signals are pulses of selected widths.

14. The system of claim 2 including a flip-flop, means for changing the state of the flip-flop output whenever the flow rate varies across both limits, means for generating a strobe whenever the output of the flip-flop changes state, and means for generating the backlash signal in response to the strobe.

15. The system of claim 14 including means for adjusting the duration of the backlash signal.

16. The system of claim 2 including first and second switching means, means for causing the motor to operate in a direction so as to close the valve means whenever the first switching means is closed, means for causing the motor to operate in a direction so as to open the valve means when the second switching means is closed, a gating network, means associated with the gating network for gating the correction signals to close the first switching means whenever the flow rate increases above the upper limit, and means associated with the gating network for gating the correction signals to close the second switching means whenever the flow rate decreases below the lower limit.

17. The system of claim 16 further including means associated with the gating network for gating the backlash signal to close the first switching means whenever the flow rate increases across both limits, and means associated with the gating network for gating the backlash signal to open the second switching means whenever the flow rate decreases across both limits.

18. The system of claim 2, including means for disabling the automatic controls system, a manual switch, and means responsive to operation of the manual switch for causing the motor to operate in a selected direction.

19. A method for controlling the rate of fluid flow through a fluid line of a fluid system characterized as having backlash, comprising the step of measuring the flow rate of the fluid in relation to limits within which the flow rate is to be controlled, generating electrical correction pulses of selected widths whenever the flow rate varies to outside the limits, operating a motor in response to the correction pulses in a direction to cause the flow rate to change to within the prescribed limits, generating an electrical backlash signal whenever the flow ate varies across both limits, and operating the motor in response to the backlash signal in a direction to remove the backlash from the system.

* * * * *